US012309135B2

(12) United States Patent
Han et al.

(10) Patent No.: US 12,309,135 B2
(45) Date of Patent: *May 20, 2025

(54) FEDERATED LOGIN WITH CENTRALIZED CONTROL

(71) Applicant: Rubrik, Inc., Palo Alto, CA (US)

(72) Inventors: Seungyeop Han, Sunnyvale, CA (US); Hao Wu, Mountain View, CA (US); Xiaopeng Xu, Sunnyvale, CA (US); Tiffany Lin, San Mateo, CA (US)

(73) Assignee: Rubrik, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/212,651

(22) Filed: Jun. 21, 2023

(65) Prior Publication Data

US 2023/0379317 A1 Nov. 23, 2023

Related U.S. Application Data

(63) Continuation of application No. 17/387,083, filed on Jul. 28, 2021, now Pat. No. 11,722,475.

(60) Provisional application No. 63/058,650, filed on Jul. 30, 2020.

(51) Int. Cl.
*H04L 9/40* (2022.01)

(52) U.S. Cl.
CPC ........ *H04L 63/0815* (2013.01); *H04L 63/083* (2013.01); *H04L 63/101* (2013.01); *H04L 63/104* (2013.01)

(58) Field of Classification Search
CPC . H04L 63/0815; H04L 63/083; H04L 63/101; H04L 63/104
See application file for complete search history.

(56) References Cited

U.S. PATENT DOCUMENTS

| | | | |
|---|---|---|---|
| 7,698,398 B1 * | 4/2010 | Lai | G06Q 30/00 709/228 |
| 8,434,129 B2 | 4/2013 | Kannappan et al. | |
| 8,893,293 B1 | 11/2014 | Schmoyer et al. | |
| 10,922,284 B1 * | 2/2021 | Venkatasubramanian | G06F 9/5022 |
| 10,951,604 B1 * | 3/2021 | Venkatasubramanian | G06F 16/182 |
| 11,722,475 B2 | 8/2023 | Han et al. | |
| 2006/0129817 A1 | 6/2006 | Borneman et al. | |
| 2012/0144034 A1 * | 6/2012 | McCarty | H04L 63/0823 709/225 |
| 2016/0323375 A1 * | 11/2016 | Shanley | H04L 41/122 |
| 2016/0323376 A1 * | 11/2016 | Shanley | H04L 67/1061 |
| 2017/0329957 A1 * | 11/2017 | Vepa | G06F 21/445 |
| 2018/0075231 A1 * | 3/2018 | Subramanian | H04L 63/0807 |
| 2018/0077144 A1 | 3/2018 | Gangawane et al. | |
| 2018/0131685 A1 | 5/2018 | Sridhar et al. | |
| 2018/0276041 A1 | 9/2018 | Bansal et al. | |
| 2020/0014580 A1 * | 1/2020 | Le Mouel | H04L 41/042 |
| 2020/0034459 A1 * | 1/2020 | Rabe | G06F 16/273 |

(Continued)

*Primary Examiner* — Techane Gergiso

(74) *Attorney, Agent, or Firm* — Holland & Hart LLP

(57) ABSTRACT

In some examples, a centralized management system comprises a central management console including a federated login system embedded in the centralized management system. The federated login system includes at least one processor configured to perform operations in a method of federated login and authorization allowing a user of the centralized management system to manage connected clusters or products without performing an individual cluster or product login.

14 Claims, 8 Drawing Sheets

(56) References Cited

U.S. PATENT DOCUMENTS

2021/0075870 A1\* 3/2021 Kempf .................. G06F 9/5005
2022/0038449 A1\* 2/2022 Tripp ...................... H04L 67/02

\* cited by examiner

FEDERATED LOGIN WITH CENTRALIZED CONTROL

CLAIM OF PRIORITY

This patent application is a continuation of U.S. patent application Ser. No. 17/387,083 to Han et al., entitled "FEDERATED LOGIN WITH CENTRALIZED CONTROL" and filed on Jul. 28, 2021, which claims the benefit of U.S. Provisional Patent Application Ser. No. 63/058,650 to Han et al., entitled "FEDERATED LOGIN WITH CENTRALIZED CONTROL" and filed on Jul. 30, 2020, each of which is hereby incorporated by reference herein in its entirety.

TECHNICAL FIELD

The present disclosure generally relates to a centralized data management system using user authentication and authorization mechanisms, such as federated login and authorization translation, to allow centralized management of a plurality of clusters or products.

BACKGROUND

The volume and complexity of data that is collected, analyzed, and stored are increasing rapidly over time. The computer infrastructure used to handle user authorization and authentication, especially when multiple clusters or products are involved, has become more complex over time, demanding more processing power. As a result, centralized control over multiple clusters or products is becoming increasingly important.

SUMMARY

In some examples, a centralized management system comprises a central management console; a federated login system embedded in the centralized management system, the federated login system including at least one processor configured to perform operations in a method of federated login and authorization allowing a user of the centralized management system to manage connected clusters or products without performing an individual cluster or product login, the operations comprising at least: configuring an authority of the user based on one or more options, the one or more options including a cluster object type, a cluster type, and a data source; selecting a service level agreement (SLA) domain associated with each option configuring the authority; based on a registration of the centralized management system, enabling a Security Assertion Markup Language (SAML)-based federated login using the central management console, the federated login programmed into a central management console registration workflow and a Role-Based Access Control (RBAC) framework to support transparent handshake under a SAML protocol and authorization synchronization between the connected clusters or products; and receiving, from a connected cluster or product, a SAML-based federated login handshake based on a registration of the connected cluster or product with the centralized management system.

In some examples, a SAML specification includes an identity provider (IdP), and a service provider (SP).

In some examples, for a federated login mechanism, the centralized management system serves as the IdP, and a connected cluster or product serves as the SP.

In some examples, for an IdP-initiated login, the operations further comprise receiving from the user of the centralized management system a selection of a resource listed on an inventory page of the central management console, the selection directing the user to a web user interface (UI) of a connected cluster or product associated with the resource.

In some examples, the resource includes a protected database or a virtual machine.

In some examples, for an SP-initiated federated login, the operations further comprise enabling an identified user of the centralized management system to log in to a web UI of a connected cluster using the identity of the user of the centralized management system.

In some examples, the operations further comprise configuring a Role-Based Access Control (RBAC) in the centralized management system, and based on an implemented RBAC configuration in the centralized management system, automatically applying RBAC across all connected clusters or products.

In some examples, the operations further comprise enabling RBAC across all the connected clusters or products by passing, via a translation layer of the centralized management system, authorization information of the user using a role-based attribute in an SAML assertion session.

In some examples, the operations further comprise storing a mapping between the SAML assertion session and the authorization information.

BRIEF DESCRIPTION OF THE DRAWINGS

Some embodiments are illustrated by way of example and not limitation in the views of the accompanying drawing.

DETAILED DESCRIPTION

Figure 1A:
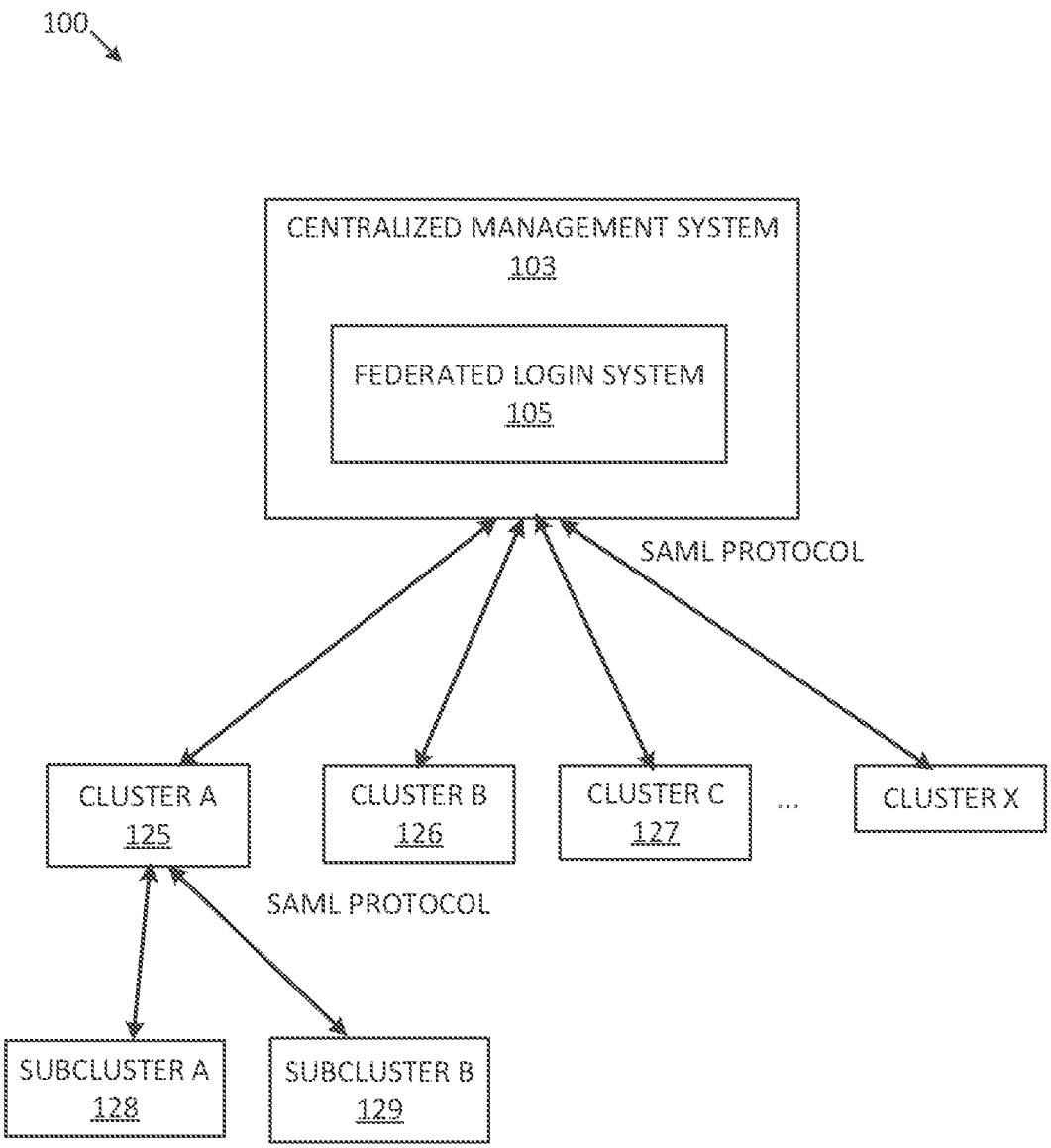
FIG. 1A is a block diagram illustrating an example networked computing environment in which some embodiments described herein are practiced.

The description that follows includes systems, methods, techniques, instruction sequences, and computing machine program products that embody illustrative embodiments of the present disclosure. In the following description, for purposes of explanation, numerous specific details are set forth in order to provide a thorough understanding of example embodiments. It will be evident, however, to one skilled in the art that the present inventive subject matter may be practiced without these specific details.

Challenging issues can arise in processes that include individual log-ins into multiple clusters, especially when users seek to manage clusters or products from a centralized management system. Specifically, certain clusters or products from the same organization may be developed using independent access control systems corresponding to user authentication and authorization mechanisms. While users may remotely manage some features of these clusters or products via a centralized management system, for certain features associated with certain clusters that are not available under the centralized management system, users are required to visit each cluster individually. For such visits, users are required to log in separately to each cluster, and it can become burdensome for an administrator to configure each cluster individually to associate the correct authorization settings for each user.

In some examples, a federated login and authorization system (hereinafter a federated login system) is embedded in a centralized management system and provides centralized data management. In some examples, a federated login system may include an authorization translation function. In some examples, the federated login system allows users to manage multiple clusters or products efficiently without having to log in to each of them individually.

In some embodiments, a centralized management system includes a Central Management Console (CMC). The CMC may include or be a SaaS platform for data management applications. A Security Assertion Markup Language (SAML) protocol is an example protocol for exchanging authentication and authorization data between parties, in particular, between an identity provider and a service provider. A cluster may include one or more objects. An administrator of the centralized management system may configure the authority granted to users based on object types, cluster types, or data sources. Under each option, the administrator may select SLA (Service Level Agreement) domains associated with each option. In some embodiments, an administrator of the centralized management system is by default granted full administrative authority for all connected clusters or products. In some examples, a cluster is an instance of a product. A product may be associated with one or more clusters of different instances of the product. A product may include multiple objects.

Upon registration into the centralized management system, each product enables SAML-based federated login with the management console. Unlike regular SAML-based Single Sign-On (SSO), the federated login is programmed into the management console registration workflow and the Role-Based Access Control (RBAC) framework to support transparent handshake under SAML protocol and authorization synchronization between clusters or products.

Each cluster automatically performs SAML-based federated login handshake (i.e., SAML metadata exchange) once it is registered to the centralized management system, which allows the federated login to be transparent to users. The SAML specification defines three roles, e.g., the principal, the identity provider (IdP) and the service provider (SP). According to the federated login mechanism, the centralized management system serves as the Identity Provider (IdP), and the connected clusters serve as Service Providers (SP). The centralized management system may use Identity Providers, such as SAML, or LDAP, to authenticate users.

Both IdP-initiated and SP-initiated federated login are supported by the centralized management system. In some embodiments, for an IdP-initiated login, a user of the centralized management system may select the resource, such as a protected database or a virtual machine, listed on the inventory page of the management console and the selection directs the user to a web user interface (UI) of the cluster or product that is associated with the resource. For an SP-initiated federated login, users may log in to the web UI of a cluster with the identity of the user of the centralized management system. In both of the IdP-initiated and SP-initiated federated login flows, users only need to have a single logged-in session in the centralized management system to access all connected clusters or products, depending on the authority granted by the system. Users do not need to provide independent credentials of each cluster or product connected to the centralized management system.

In some embodiments, in addition to the process of centralized user identity authentication, the centralized management system provides functions of a centralized Role-Based Access Control (RBAC). Once RBAC is configured in the centralized management system, it automatically applies to all connected clusters or products. To enable RBAC across all clusters or products, the system passes authorization information of the user via a role-based attribute in the SAML assertion. When a cluster is created and connected (e.g., registered) to the centralized management system, a communication path for translated authorization is established by embedding the role-based attributes into SAML assertion. The system then stores a mapping between the assertion session and the authorization information. The authorization information indicates the roles and authorizations the user is assigned associated with each assigned resource. Each role assigned to a user may indicate the authority a user may have to access the resource in a specific cluster or product. For example, a first user may be assigned as an administrator role that enables the user to perform all operations to all connected clusters, including creating, editing, and viewing all resources in the cluster. A second user may be assigned a guest role, which may only allow the user to view the resources in a specific cluster or product, such as a protected database. The authorization information is translated from the RBAC policies defined in the centralized management system, and passed via the communication paths established in clusters or products upon creation.

In some embodiments, clusters or products may serve the functions as service providers that they receive translated authorization information through SAML assertion during the authentication process. The translated authorization information contains the definition of a role (e.g. a role-based attribute) that is assigned to the user. The role-based attribute includes information related to the set of permissions to access the objects subject to each cluster or product. Each cluster or product has its own translation logic.

While the centralized management system stores the information of all role-based attributes assigned to each user and each cluster or product, the role-based attributes may vary depending on clusters and versions of the clusters. Therefore, the centralized management system has a translation layer to provide the authorization information of each version of the cluster and the object set associated with each version of the cluster. In some embodiments, a customer includes three users. Each user is defined in the centralized management system and is granted access to three clusters, i.e., clusters A, B, and C. When the first user has the full administrative permission for accessing all objects, the first user is granted full administrative authority for all connected products that include the objects. For example, if cluster C does not include any of the granted objects, the first user does not have access to cluster C. When the second user is only granted database level administrative permission and the permission is restricted to cluster A, then the second user is granted limited administrative authority to databases when a database is connected to cluster A. The second user will not have authority to access clusters B or C. When the third user is granted viewing authority of a specific object, then the user is able to access any cluster that contains the object.

In some embodiments, permissions and objects may be translated according to predefined rules. For example, permissions P1 and P2 are merged into a specific version of a cluster, PM. When the permission PM is assigned to a user and the user requests to access an earlier version of the cluster, the centralized management system may assign P1 or P2 instead of PM, so that the cluster may allow the user access only to the extent permitted under P1 or P2 corresponding to the version of the cluster the user is accessing. For objects, the system converts ID format to match the ID of the target cluster.

In some embodiments, once the authorities are translated to ones understood by the connected products, it allows the administrator of the central management console to have full control over the connected clusters or products, provided that the administrator has the full administrative authority of the connected clusters or products. Administrators may control the overall lifecycle of the products and devices, such as adding or removing nodes in the cluster, changing configurations, or even terminating the cluster.

Reference will now be made in detail to embodiments of the present disclosure, examples of which are illustrated in the appended drawings. The present disclosure may, however, be embodied in many different forms and should not be construed as being limited to the embodiments set forth herein. It will be appreciated that some of the examples disclosed herein are described in the context of virtual machines that are backed up by using base and incremental snapshots, for example. This should not necessarily be regarded as limiting of the disclosures. The disclosures, systems, and methods described herein apply not only to virtual machines of all types that run a file system (for example), but also to NAS devices, physical machines (for example Linux servers), and databases.

FIG. 1A is a block diagram illustrating an example networked computing environment 100 in which some embodiments described herein are practiced. In some embodiments, an authentication and authorization framework is embedded in the federated login system 105 in the centralized management system 103. The centralized management system 103 is communicatively coupled to a plurality of clusters, including clusters 125, 126, 127 as shown in FIG. 1A. Cluster A includes two sub-clusters A and B. A cluster may be a product including a plurality of objects. An object may correspond to a virtual machine or a node.

In some embodiments, the centralized management system 103, and all the connected clusters and sub-clusters, supports Security Assertion Markup Language (SAML) protocol communication. The centralized management system 103 is a SaaS platform. A user of the centralized management system 103, depending on the authority the system assigned, may assign roles to one or more users. Each role corresponds to a pre-configured authority of access to clusters, sub-clusters, and objects connected therein. The type of pre-configured roles may include administrator and database administrator. A user who is assigned the administrator role may have full access or authority to all clusters connected to the centralized management system 103, including creating, editing, and viewing all resources in the cluster. A user who is assigned a database-administrator role may only have access to clusters that include a database as a type of object.

In some embodiments, the clusters 125, 126, 127 may serve the functions as service providers in the SAML assertion process. The clusters 125, 126, 127 receive translated authorization information respectively from the federated login system 105 during the user identity authentication process (e.g., SAML assertion) and configure respective clusters to authenticate and grant authority of users accordingly. Because each type of cluster has its own access control system built-in, the translated authorization information is specific to each cluster depending on the type of clusters, including a data management system 102 in FIG. 1D for backing up virtual machines or files within a virtualized infrastructure, and a management system for NoSQL databases.

The translated authorization information includes various attributes associated with the user, including the name, email address, IP address, and role-based attribute of the user. The translated authorization information is stored in the federated login system 105 in a metadata mapping in a database (not shown) coupled to the system 105. Each cluster or product has its own translation logic corresponding to the respective translated authorization information. The translated authorization information includes version attributes of the cluster or product it is being directed to, as the authority granted to a user may change depending on the versions of the cluster. The centralized management system 103 includes a translation layer (not shown) to provide the authorization information of each version of the cluster and the object set associated with each version of the cluster.

In some embodiments, a user granted with full access or authority, such as an administrator role, may be able to view, edit and remove clusters and the sub-clusters associated thereof. For example, a user with an administrator role of the centralized management system 103 may remove, from the user interface of the centralized management system 103, the sub-cluster 128 from the Cluster A 125, remove nodes (shown in FIG. 2) associated with Cluster A 125, or terminate Cluster A 125 altogether without having to log in to the Cluster A 125 to perform such operations.

In some embodiments, the authorization is translated according to predefined rules, including users who may only be granted authorization associated with the version of the cluster they intend to access. For example, the Cluster A 125 may correspond to two versions, each version being associated with a timestamp at the time the version is created. For example, in the first version, a user is granted authority to access only the sub-cluster A 128. In the second (e.g., a more recent) version of Cluster A 125, the user is only granted authority to access both of the sub-cluster A 128 and sub-cluster B 129. If the user, operating from the centralized management system 103, requests to access the first version of the Cluster A 125, the user is only granted access to the sub-cluster A 128.

Figure 1B:
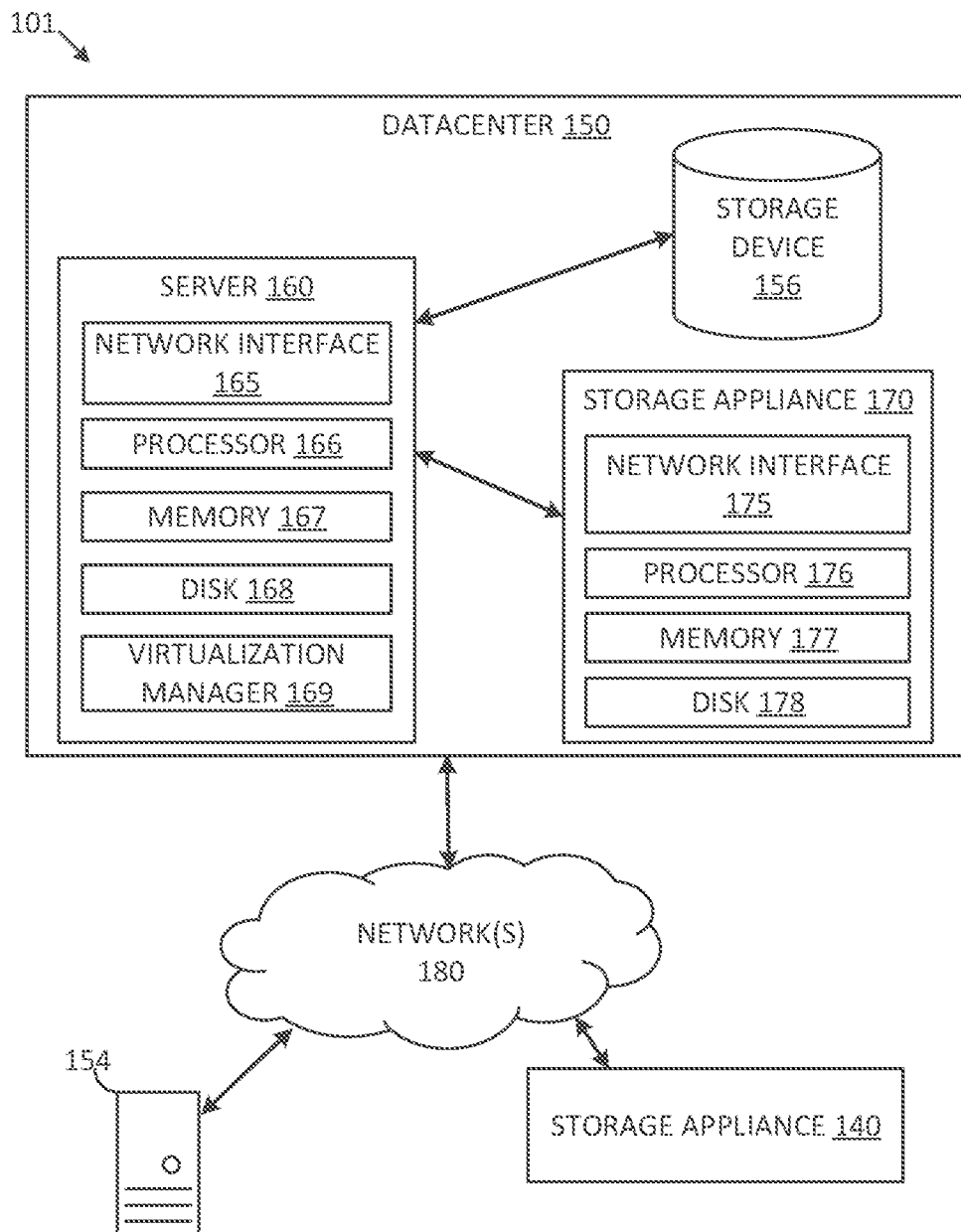
FIG. 1B is a block diagram illustrating another example networked computing environment in which some embodiments described herein are practiced.

FIG. 1B is a block diagram illustrating another example of a networked computing environment 101 in which some embodiments are practiced. As depicted, the networked computing environment 101 includes a data center 150, a storage appliance 140, and a computing device 154 in communication with each other via one or more networks 180. The networked computing environment 101 may include a plurality of computing devices interconnected through one or more networks 180. The one or more networks 180 may allow computing devices and/or storage devices to connect to and communicate with other computing devices and/or other storage devices. In some cases, the networked computing environment 101 may include other computing devices and/or other storage devices not shown. The other computing devices may include, for example, a mobile computing device, a non-mobile computing device, a server, a workstation, a laptop computer, a tablet computer, a desktop computer, or an information processing system. The other storage devices may include, for example, a storage area network storage device, a networked-attached storage device, a hard disk drive, a solid-state drive, or a data storage system. The data center 150 may host a plurality of clusters connected to the centralized management system 103, including data management systems 102 (FIG. 1D).

The data center 150 may include one or more servers, such as server 160, in communication with one or more storage devices, such as storage device 156. The one or more servers may also be in communication with one or more storage appliances, such as storage appliance 170. The server 160, storage device 156, and storage appliance 170 may be in communication with each other via a networking fabric connecting servers and data storage units within the data center to each other. The storage appliance 170 may include a data management system for backing up virtual machines and/or files within a virtualized infrastructure. The server 160 may be used to create and manage one or more virtual machines associated with a virtualized infrastructure. The one or more virtual machines may run various applications, such as a cloud-based service, a database application or a web server. The storage device 156 may include one or more hardware storage devices for storing data, such as a hard disk drive (HDD), a magnetic tape drive, a solid-state drive (SSD), a storage area network (SAN) storage device, or a networked-attached storage (NAS) device. In some cases, a data center, such as data center 150, may include thousands of servers and/or data storage devices in communication with each other. The data storage devices may comprise a tiered data storage infrastructure (or a portion of a tiered data storage infrastructure). The tiered data storage infrastructure may allow for the movement of data across different tiers of a data storage infrastructure between higher-cost, higher-performance storage devices (e.g., solid-state drives and hard disk drives) and relatively lower-cost, lower-performance storage devices (e.g., magnetic tape drives).

The one or more networks 180 may include a secure network such as an enterprise private network, an unsecure network such as a wireless open network, a local area network (LAN), a wide area network (WAN), and the Internet. The one or more networks 180 may include a cellular network, a mobile network, a wireless network, or a wired network. Each network of the one or more networks 180 may include hubs, bridges, routers, switches, and wired transmission media such as a direct-wired connection. The one or more networks 180 may include an extranet or other private network for securely sharing information or providing controlled access to applications or files.

A server, such as server 160, may allow a client to download information or files (e.g., executable, text, application, audio, image, or video files) from the server 160 or to perform a search query related to particular information stored on the server 160. In some cases, a server may act as an application server or a file server. In general, a server may refer to a hardware device that acts as the host in a client-server relationship or a software process that shares a resource with or performs work for one or more clients.

One embodiment of server 160 includes a network interface 165, processor 166, memory 167, disk 168, and virtualization manager 169 all in communication with each other. Network interface 165 allows server 160 to connect to one or more networks 180. Network interface 165 may include a wireless network interface and/or a wired network interface. Processor 166 allows server 160 to execute computer-readable instructions stored in memory 167. Processor 166 may include one or more processing units or processing devices, such as one or more CPUs and/or one or more GPUs. Memory 167 may comprise one or more types of memory (e.g., RAM, SRAM, DRAM, ROM, EEPROM, Flash, etc.). Disk 168 may include a hard disk drive and/or a solid-state drive. Memory 167 and disk 168 may comprise hardware storage devices.

The virtualization manager 169 may manage a virtualized infrastructure and perform management operations associated with the virtualized infrastructure. The virtualization manager 169 may manage the provisioning of virtual machines running within the virtualized infrastructure and provide an interface to computing devices interacting with the virtualized infrastructure. In one example, the virtualization manager 169 may set a virtual machine into a frozen state in response to a snapshot request made via an application programming interface (API) by a storage appliance, such as storage appliance 170. Setting the virtual machine into a frozen state may allow a point-in-time snapshot of the virtual machine to be stored or transferred. In one example, updates made to a virtual machine that has been set into a frozen state may be written to a separate file (e.g., an update file) while the virtual disk file associated with the state of the virtual disk at the point in time is frozen. The virtual disk file may be set into a read-only state to prevent modifications to the virtual disk file while the virtual machine is in the frozen state. The virtualization manager 169 may then transfer data associated with the virtual machine (e.g., an image of the virtual machine or a portion of the image of the virtual machine) to a storage appliance in response to a request made by the storage appliance. After the data associated with the point-in-time snapshot of the virtual machine has been transferred to the storage appliance, the virtual machine may be released from the frozen state (i.e., unfrozen) and the updates made to the virtual machine and stored in the separate file may be merged into the virtual disk file. The virtualization manager 169 may perform various virtual machine related tasks, such as cloning virtual machines, creating new virtual machines, monitoring the state of virtual machines, moving virtual machines between physical hosts for load balancing purposes, and facilitating backups of virtual machines.

One embodiment of storage appliance 170 includes a network interface 175, processor 176, memory 177, and disk 178 all in communication with each other. Network interface 175 allows storage appliance 170 to connect to one or more networks 180. Network interface 175 may include a wireless network interface and/or a wired network interface. Processor 176 allows storage appliance 170 to execute computer-readable instructions stored in memory 177. Processor 176 may include one or more processing units, such as one or more CPUs and/or one or more GPUs. Memory 177 may comprise one or more types of memory (e.g., RAM, SRAM, DRAM, ROM, EEPROM, NOR Flash, NAND Flash, etc.). Disk 178 may include a hard disk drive and/or a solid-state drive. Memory 177 and disk 178 may comprise hardware storage devices.

In one embodiment, the storage appliance 170 may include four machines. Each of the four machines may include a multi-core CPU, 64 GB of RAM, a 400 GB SSD, three 4 TB HDDs, and a network interface controller. In this case, the four machines may be in communication with the one or more networks 180 via the four network interface controllers. The four machines may comprise four nodes of a server cluster. The server cluster may comprise a set of physical machines that are connected together via a network. The server cluster may be used for storing data associated with a plurality of virtual machines, such as backup data associated with different point in time versions of 1000 virtual machines.

The networked computing environment 101 may provide a cloud computing environment for one or more computing devices. Cloud computing may refer to Internet-based computing, wherein shared resources, software, and/or information may be provided to one or more computing devices on-demand via the Internet. The networked computing environment 101 may comprise a cloud computing environment providing Software-as-a-Service (SaaS) or Infrastructure-as-a-Service (IaaS) services. SaaS may refer to a software distribution model in which applications are hosted by a service provider and made available to end users over the Internet. In one embodiment, the networked computing environment 101 may include a virtualized infrastructure that provides software, data processing, and/or data storage services to end users accessing the services via the networked computing environment. In one example, networked computing environment 101 may provide cloud-based work productivity or business-related applications to a computing device, such as computing device 154. The storage appliance 140 may comprise a cloud-based data management system for backing up virtual machines and/or files within a virtualized infrastructure, such as virtual machines running on server 160 or files stored on server 160.

In some cases, networked computing environment 101 may provide remote access to secure applications and files stored within data center 150 from a remote computing device, such as computing device 154. The data center 150 may use an access control application to manage remote access to protected resources, such as protected applications, databases, or files located within the data center. To facilitate remote access to secure applications and files, a secure network connection may be established using a virtual private network (VPN). A VPN connection may allow a remote computing device, such as computing device 154, to securely access data from a private network (e.g., from a company file server or mail server) using an unsecure public network or the Internet. The VPN connection may require client-side software (e.g., running on the remote computing device) to establish and maintain the VPN connection. The VPN client software may provide data encryption and encapsulation prior to the transmission of secure private network traffic through the Internet.

In some embodiments, the storage appliance 170 may manage the extraction and storage of virtual machine snapshots associated with different point-in-time versions of one or more virtual machines running within the data center 150. A snapshot of a virtual machine may correspond with a state of the virtual machine at a particular point in time. In response to a restore command from the server 160, the storage appliance 170 may restore a point-in-time version of a virtual machine or restore point-in-time versions of one or more files located on the virtual machine and transmit the restored data to the server 160. In response to a mount command from the server 160, the storage appliance 170 may allow a point-in-time version of a virtual machine to be mounted and allow the server 160 to read and/or modify data associated with the point-in-time version of the virtual machine. To improve storage density, the storage appliance 170 may deduplicate and compress data associated with different versions of a virtual machine and/or deduplicate and compress data associated with different virtual machines. To improve system performance, the storage appliance 170 may first store virtual machine snapshots received from a virtualized environment in a cache, such as a flash-based cache. The cache may also store popular data or frequently accessed data (e.g., based on a history of virtual machine restorations, incremental files associated with commonly restored virtual machine versions) and current day incremental files or incremental files corresponding with snapshots captured within the past 24 hours.

An incremental file may comprise a forward incremental file or a reverse incremental file. A forward incremental file may include a set of data representing changes that have occurred since an earlier point-in-time snapshot of a virtual machine. To generate a snapshot of the virtual machine corresponding with a forward incremental file, the forward incremental file may be combined with an earlier point-in-time snapshot of the virtual machine (e.g., the forward incremental file may be combined with the last full image of the virtual machine that was captured before the forward incremental was captured and any other forward incremental files that were captured subsequent to the last full image and prior to the forward incremental file). A reverse incremental file may include a set of data representing changes from a later point-in-time snapshot of a virtual machine. To generate a snapshot of the virtual machine corresponding with a reverse incremental file, the reverse incremental file may be combined with a later point-in-time snapshot of the virtual machine (e.g., the reverse incremental file may be combined with the most recent snapshot of the virtual machine and any other reverse incremental files that were captured prior to the most recent snapshot and subsequent to the reverse incremental file).

The storage appliance 170 may provide a user interface (e.g., a web-based interface or a graphical user interface) that displays virtual machine backup information such as identifications of the virtual machines protected and the historical versions or time machine views for each of the virtual machines protected. A time machine view of a virtual machine may include snapshots of the virtual machine over a plurality of points in time. Each snapshot may comprise the state of the virtual machine at a particular point in time. Each snapshot may correspond with a different version of the virtual machine (e.g., Version 1 of a virtual machine may correspond with the state of the virtual machine at a first point in time and Version 2 of the virtual machine may correspond with the state of the virtual machine at a second point in time subsequent to the first point in time).

The user interface may enable an end user of the storage appliance 170 (e.g., a system administrator or a virtualization administrator) to select a particular version of a virtual machine to be restored or mounted. When a particular version of a virtual machine has been mounted, the particular version may be accessed by a client (e.g., a virtual machine, a physical machine, or a computing device) as if the particular version was local to the client. A mounted version of a virtual machine may correspond with a mount point directory (e.g., /snapshots/VM5/Version23). In one example, the storage appliance 170 may run an NFS server and make the particular version (or a copy of the particular version) of the virtual machine accessible for reading and/or writing. The end user of the storage appliance 170 may then select the particular version to be mounted and run an application (e.g., a data analytics application) using the mounted version of the virtual machine. In another example, the particular version may be mounted as an iSCSI target.

In some embodiments, the management system 103 provides management of one or more clusters of nodes as described herein, such as management of one or more policies with respect to the one or more clusters of nodes. The management system 103 can serve as a cluster manager for one or more clusters of nodes (e.g., present in the networked computing environment 101). According to various embodiments, the management system 103 provides for central management of policies (e.g., SLAs) that remotely manages and synchronizes policy definitions with clusters of nodes. For some embodiments, the management system 103 facilitates automatic setup of secure communications channels between clusters of nodes to facilitate replication of data. Additionally, for some embodiments, the management system 103 manages archival settings for one or more clusters of nodes with respect to cloud-based data storage resource provided by one or more cloud service provider.

Figure 1C:
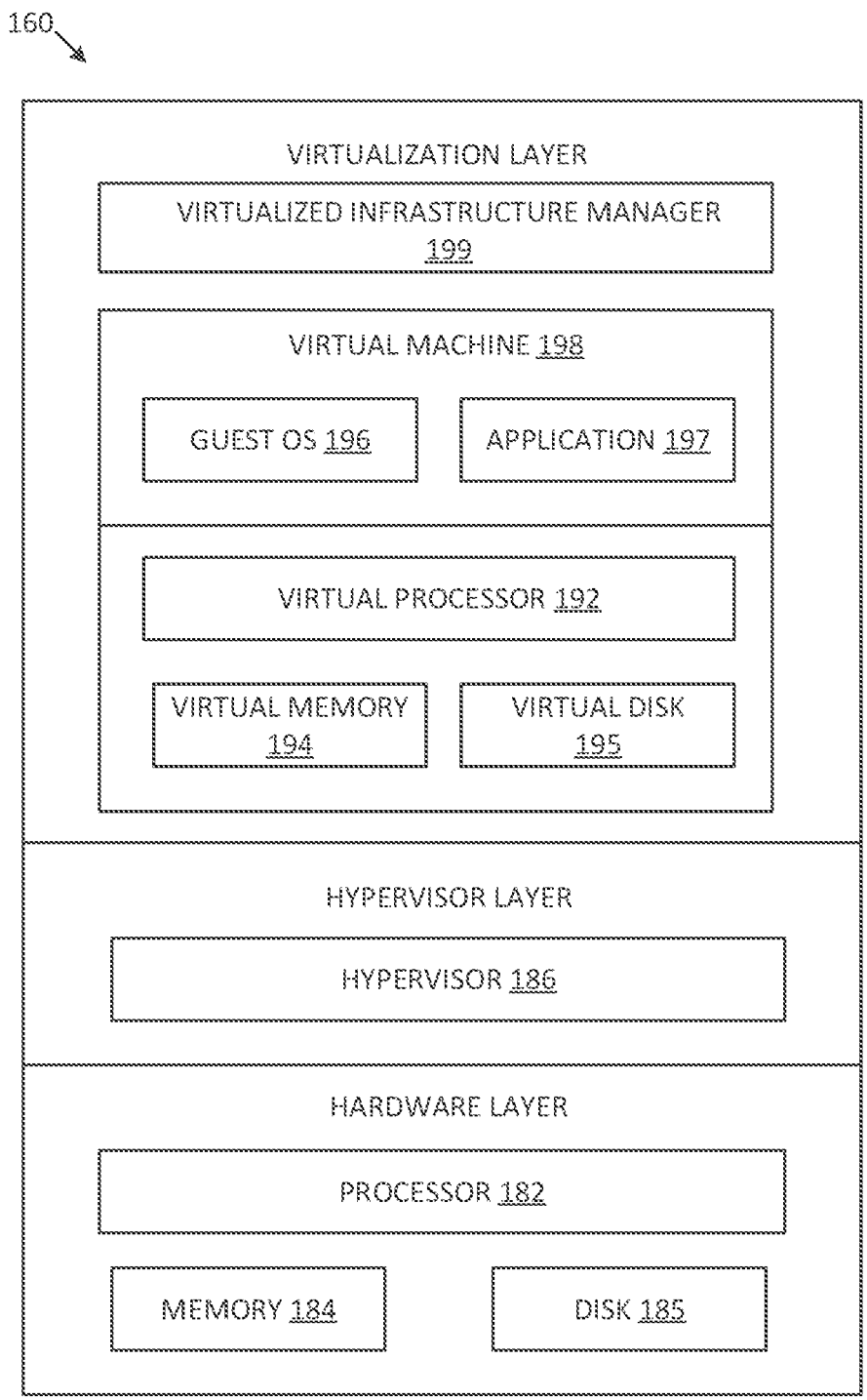
FIG. 1C is a block diagram illustrating one embodiment of a server in the example networked computing environment of FIG. 1B.
Figure 1D:
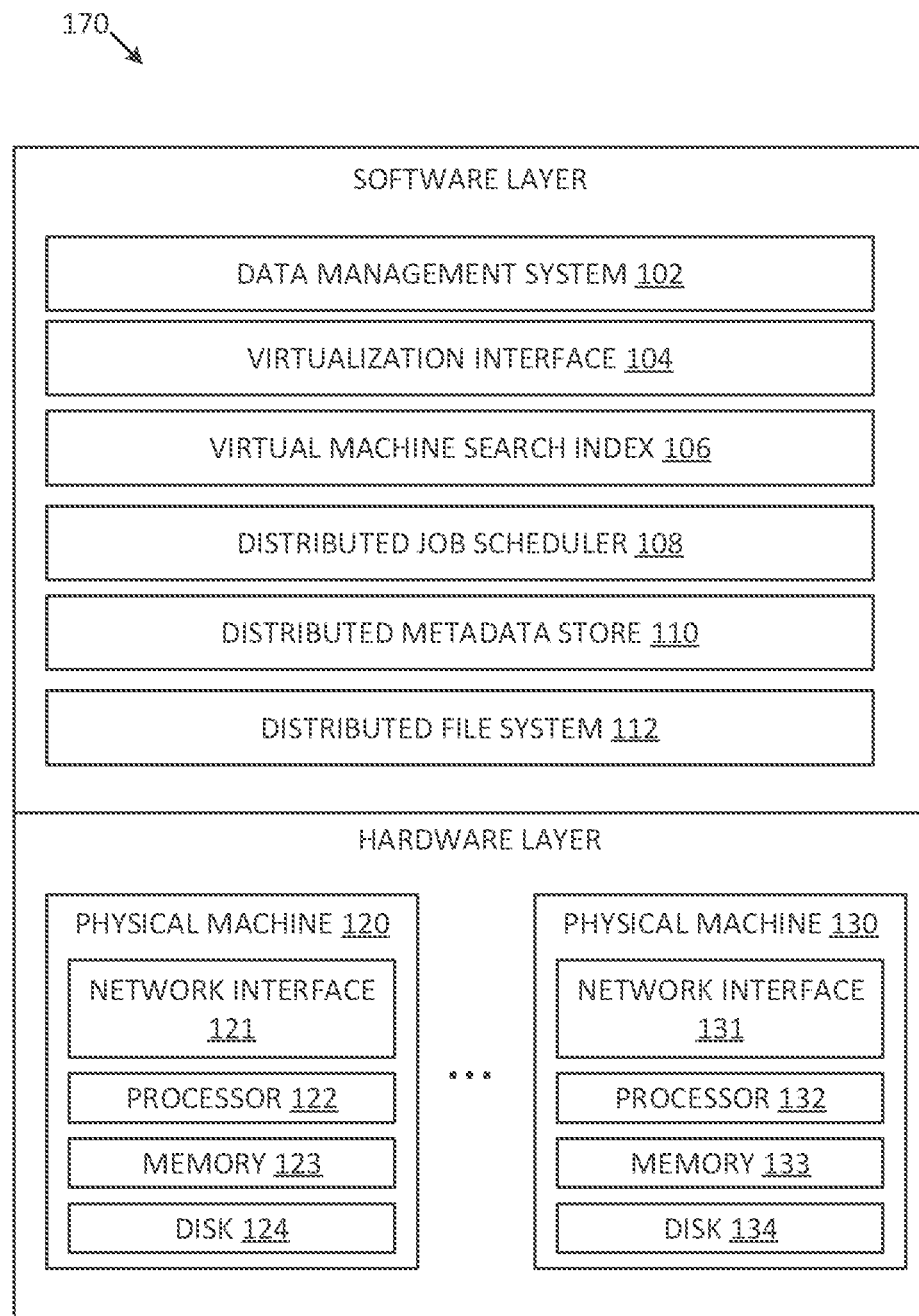
FIG. 1D is a block diagram illustrating one embodiment of a storage appliance in the example networked computing environment of FIG. 1B.

FIG. 1C is a block diagram illustrating one embodiment of server 160 in FIG. 1B. The server 160 may comprise one server out of a plurality of servers that are networked together within a data center. In one example, the plurality of servers may be positioned within one or more server racks within the data center. As depicted, the server 160 includes hardware-level components and software-level components. The hardware-level components include one or more processors 182, one or more memory 184, and one or more disks 185. The software-level components include a hypervisor 186, a virtualized infrastructure manager 199, and one or more virtual machines, such as virtual machine 198. The hypervisor 186 may comprise a native hypervisor or a hosted hypervisor. The hypervisor 186 may provide a virtual operating platform for running one or more virtual machines, such as virtual machine 198. Virtual machine 198 includes a plurality of virtual hardware devices including a virtual processor 192, a virtual memory 194, and a virtual disk 195. The virtual disk 195 may comprise a file stored within the one or more disks 185. In one example, a virtual machine may include a plurality of virtual disks, with each virtual disk of the plurality of virtual disks associated with a different file stored on the one or more disks 185. Virtual machine 198 may include a guest operating system 196 that runs one or more applications, such as application 197.

The virtualized infrastructure manager 199, which may correspond with the virtualization manager 169 in FIG. 1B, may run on a virtual machine or natively on the server 160. The virtualized infrastructure manager 199 may provide a centralized platform for managing a virtualized infrastructure that includes a plurality of virtual machines. The virtualized infrastructure manager 199 may manage the provisioning of virtual machines running within the virtualized infrastructure and provide an interface to computing devices interacting with the virtualized infrastructure. The virtualized infrastructure manager 199 may perform various virtualized infrastructure related tasks, such as cloning virtual machines, creating new virtual machines, monitoring the state of virtual machines, and facilitating backups of virtual machines.

In one embodiment, the server 160 may use the virtualized infrastructure manager 199 to facilitate backups for a plurality of virtual machines (e.g., eight different virtual machines) running on the server 160. Each virtual machine running on the server 160 may run its own guest operating system and its own set of applications. Each virtual machine running on the server 160 may store its own set of files using one or more virtual disks associated with the virtual machine (e.g., each virtual machine may include two virtual disks that are used for storing data associated with the virtual machine).

In one embodiment, a data management application running on a storage appliance, such as storage appliance 140 in FIG. 1B or storage appliance 170 in FIG. 1B, may request a snapshot of a virtual machine running on server 160. The snapshot of the virtual machine may be stored as one or more files, with each file associated with a virtual disk of the virtual machine. A snapshot of a virtual machine may correspond with a state of the virtual machine at a particular point in time. The particular point in time may be associated with a time stamp. In one example, a first snapshot of a virtual machine may correspond with a first state of the virtual machine (including the state of applications and files stored on the virtual machine) at a first point in time (e.g., 5:30 p.m. on Jun. 29, 2024) and a second snapshot of the virtual machine may correspond with a second state of the virtual machine at a second point in time subsequent to the first point in time (e.g., 5:30 p.m. on Jun. 30, 2024).

In response to a request for a snapshot of a virtual machine at a particular point in time, the virtualized infrastructure manager 199 may set the virtual machine into a frozen state or store a copy of the virtual machine at the particular point in time. The virtualized infrastructure manager 199 may then transfer data associated with the virtual machine (e.g., an image of the virtual machine or a portion of the image of the virtual machine) to the storage appliance. The data associated with the virtual machine may include a set of files including a virtual disk file storing contents of a virtual disk of the virtual machine at the particular point in time and a virtual machine configuration file storing configuration settings for the virtual machine at the particular point in time. The contents of the virtual disk file may include the operating system used by the virtual machine, local applications stored on the virtual disk, and user files (e.g., images and word processing documents). In some cases, the virtualized infrastructure manager 199 may transfer a full image of the virtual machine to the storage appliance or a plurality of data blocks corresponding with the full image (e.g., to enable a full image-level backup of the virtual machine to be stored on the storage appliance). In other cases, the virtualized infrastructure manager 199 may transfer a portion of an image of the virtual machine associated with data that has changed since an earlier point in time prior to the particular point in time or since a last snapshot of the virtual machine was taken. In one example, the virtualized infrastructure manager 199 may transfer only data associated with virtual blocks stored on a virtual disk of the virtual machine that have changed since the last snapshot of the virtual machine was taken. In one embodiment, the data management application may specify a first point in time and a second point in time and the virtualized infrastructure manager 199 may output one or more virtual data blocks associated with the virtual machine that have been modified between the first point in time and the second point in time.

In some embodiments, the server 160 may or the hypervisor 186 may communicate with a storage appliance, such as storage appliance 140 in FIG. 1B or storage appliance 170 in FIG. 1B, using a distributed file system protocol such as Network File System (NFS). The distributed file system protocol may allow the server 160 or the hypervisor 186 to access, read, write, or modify files stored on the storage appliance as if the files were locally stored on the server. The distributed file system protocol may allow the server 160 or the hypervisor 186 to mount a directory or a portion of a file system located within the storage appliance.

FIG. 1D is a block diagram illustrating one embodiment of storage appliance 170 in FIG. 1B. The storage appliance may include a plurality of physical machines that may be grouped together and presented as a single computing system. Each physical machine of the plurality of physical machines may comprise a node in a cluster (e.g., a failover cluster). In one example, the storage appliance may be positioned within a server rack within a data center. As depicted, the storage appliance 170 includes hardware-level components and software-level components. The hardware-level components include one or more physical machines, such as physical machine 120 and physical machine 130. The physical machine 120 includes a network interface 121, processor 122, memory 123, and disk 124 all in communication with each other. Processor 122 allows physical machine 120 to execute computer-readable instructions stored in memory 123 to perform processes described herein. Disk 124 may include a hard disk drive and/or a solid-state drive. The physical machine 130 includes a network interface 131, processor 132, memory 133, and disk 134 all in communication with each other. Processor 132 allows physical machine 130 to execute computer readable instructions stored in memory 133 to perform processes described herein. Disk 134 may include a hard disk drive and/or a solid-state drive. In some cases, disk 134 may include a flash-based SSD or a hybrid HDD/SSD drive. In one embodiment, the storage appliance 170 may include a plurality of physical machines arranged in a cluster (e.g., eight machines in a cluster). Each of the plurality of physical machines may include a plurality of multi-core CPUs, 128 GB of RAM, a 500 GB SSD, four 4 TB HDDs, and a network interface controller.

In some embodiments, the plurality of physical machines may be used to implement a cluster-based network file server. The cluster-based network file server may neither require nor use a front-end load balancer. One issue with using a front-end load balancer to host the IP address for the cluster-based network file server and to forward requests to the nodes of the cluster-based network file server is that the front-end load balancer comprises a single point of failure for the cluster-based network file server. In some cases, the file system protocol used by a server, such as server 160 in FIG. 1B, or a hypervisor, such as hypervisor 186 in FIG. 1C, to communicate with the storage appliance 170 may not provide a failover mechanism (e.g., NFS Version 3). In the case that no failover mechanism is provided on the client-side, the hypervisor may not be able to connect to a new node within a cluster in the event that the node connected to the hypervisor fails.

In some embodiments, each node in a cluster may be connected to each other via a network and may be associated with one or more IP addresses (e.g., two different IP addresses may be assigned to each node). In one example, each node in the cluster may be assigned a permanent IP address and a floating IP address and may be accessed using either the permanent IP address or the floating IP address. In this case, a hypervisor, such as hypervisor 186 in FIG. 1C, may be configured with a first floating IP address associated with a first node in the cluster. The hypervisor may connect to the cluster using the first floating IP address. In one example, the hypervisor may communicate with the cluster using the NFS Version 3 protocol. Each node in the cluster may run a Virtual Router Redundancy Protocol (VRRP) daemon. A daemon may comprise a background process. Each VRRP daemon may include a list of all floating IP addresses available within the cluster. In the event that the first node associated with the first floating IP address fails, one of the VRRP daemons may automatically assume or pick up the first floating IP address if no other VRRP daemon has already assumed the first floating IP address. Therefore, if the first node in the cluster fails or otherwise goes down, then one of the remaining VRRP daemons running on the other nodes in the cluster may assume the first floating IP address that is used by the hypervisor for communicating with the cluster.

In order to determine which of the other nodes in the cluster will assume the first floating IP address, a VRRP priority may be established. In one example, given a number (N) of nodes in a cluster from node(0) to node(N−1), for a floating IP address (i), the VRRP priority of node(j) may be (j−i) modulo N. In another example, given a number (N) of nodes in a cluster from node(0) to node(N−1), for a floating IP address (i), the VRRP priority of node(j) may be (i−j) modulo N. In these cases, node(j) will assume floating IP address (i) only if its VRRP priority is higher than that of any other node in the cluster that is alive and announcing itself on the network. Thus, if a node fails, then there may be a clear priority ordering for determining which other node in the cluster will take over the failed node's floating IP address.

In some cases, a cluster may include a plurality of nodes and each node of the plurality of nodes may be assigned a different floating IP address. In this case, a first hypervisor may be configured with a first floating IP address associated with a first node in the cluster, a second hypervisor may be configured with a second floating IP address associated with a second node in the cluster, and a third hypervisor may be configured with a third floating IP address associated with a third node in the cluster.

As depicted in FIG. 1D, the software-level components of the storage appliance 170 may include data management system 102, a virtualization interface 104, a distributed job scheduler 108, a distributed metadata store 110, a distributed file system 112, and one or more virtual machine search indexes, such as virtual machine search index 106. In one embodiment, the software-level components of the storage appliance 170 may be run using a dedicated hardware-based appliance. In another embodiment, the software-level components of the storage appliance 170 may be run from the cloud (e.g., the software-level components may be installed on a cloud service provider).

In some cases, the data storage across a plurality of nodes in a cluster (e.g., the data storage available from the one or more physical machines) may be aggregated and made available over a single file system namespace (e.g., /snapshots/). A directory for each virtual machine protected using the storage appliance 170 may be created (e.g., the directory for Virtual Machine A may be/snapshots/VM_A). Snapshots and other data associated with a virtual machine may reside within the directory for the virtual machine. In one example, snapshots of a virtual machine may be stored in subdirectories of the directory (e.g., a first snapshot of Virtual Machine A may reside in/snapshots/VM_A/s1/and a second snapshot of Virtual Machine A may reside in/snapshots/VM_A/s2/).

The distributed file system 112 may present itself as a single file system, in which as new physical machines or nodes are added to the storage appliance 170, the cluster may automatically discover the additional nodes and automatically increase the available capacity of the file system for storing files and other data. Each file stored in the distributed file system 112 may be partitioned into one or more chunks. Each of the one or more chunks may be stored within the distributed file system 112 as a separate file.

The files stored within the distributed file system 112 may be replicated or mirrored over a plurality of physical machines, thereby creating a load-balanced and fault tolerant distributed file system. In one example, storage appliance 170 may include ten physical machines arranged as a failover cluster and a first file corresponding with a snapshot of a virtual machine (e.g., /snapshots/VM_A/s1/s1.full) may be replicated and stored on three of the ten machines.

The distributed metadata store 110 may include a distributed database management system that provides high availability without a single point of failure. In one embodiment, the distributed metadata store 110 may comprise a database, such as a distributed document-oriented database. The distributed metadata store 110 may be used as a distributed key value storage system. In one example, the distributed metadata store 110 may comprise a distributed NoSQL key value store database. In some cases, the distributed metadata store 110 may include a partitioned row store, in which rows are organized into tables or other collections of related data held within a structured format within the key value store database. A table (or a set of tables) may be used to store metadata information associated with one or more files stored within the distributed file system 112. The metadata information may include the name of a file, a size of the file, file permissions associated with the file, when the file was last modified, and file mapping information associated with an identification of the location of the file stored within a cluster of physical machines. In one embodiment, a new file corresponding with a snapshot of a virtual machine may be stored within the distributed file system 112 and metadata associated with the new file may be stored within the distributed metadata store 110. The distributed metadata store 110 may also be used to store a backup schedule for the virtual machine and a list of snapshots for the virtual machine that are stored using the storage appliance 170.

In some cases, the distributed metadata store 110 may be used to manage one or more versions of a virtual machine. Each version of the virtual machine may correspond with a full image snapshot of the virtual machine stored within the distributed file system 112 or an incremental snapshot of the virtual machine (e.g., a forward incremental or reverse incremental) stored within the distributed file system 112. In one embodiment, the one or more versions of the virtual machine may correspond with a plurality of files. The plurality of files may include a single full image snapshot of the virtual machine and one or more incrementals derived from the single full image snapshot. The single full image snapshot of the virtual machine may be stored using a first storage device of a first type (e.g., a HDD) and the one or more incrementals derived from the single full image snapshot may be stored using a second storage device of a second type (e.g., an SSD). In this case, only a single full image needs to be stored and each version of the virtual machine may be generated from the single full image or the single full image combined with a subset of the one or more incrementals. Furthermore, each version of the virtual machine may be generated by performing a sequential read from the first storage device (e.g., reading a single file from a HDD) to acquire the full image and, in parallel, performing one or more reads from the second storage device (e.g., performing fast random reads from an SSD) to acquire the one or more incrementals.

The distributed job scheduler 108 may be used for scheduling backup jobs that acquire and store virtual machine snapshots for one or more virtual machines over time. The distributed job scheduler 108 may follow a backup schedule to backup an entire image of a virtual machine at a particular point in time or one or more virtual disks associated with the virtual machine at the particular point in time. In one example, the backup schedule may specify that the virtual machine be backed up at a snapshot capture frequency, such as every two hours or every 24 hours. Each backup job may be associated with one or more tasks to be performed in a sequence. Each of the one or more tasks associated with a job may be run on a particular node within a cluster. In some cases, the distributed job scheduler 108 may schedule a specific job to be run on a particular node based on data stored on the particular node. For example, the distributed job scheduler 108 may schedule a virtual machine snapshot job to be run on a node in a cluster that is used to store snapshots of the virtual machine in order to reduce network congestion.

The distributed job scheduler 108 may comprise a distributed fault tolerant job scheduler, in which jobs affected by node failures are recovered and rescheduled to be run on available nodes. In one embodiment, the distributed job scheduler 108 may be fully decentralized and implemented without the existence of a master node. The distributed job scheduler 108 may run job scheduling processes on each node in a cluster or on a plurality of nodes in the cluster. In one example, the distributed job scheduler 108 may run a first set of job scheduling processes on a first node in the cluster, a second set of job scheduling processes on a second node in the cluster, and a third set of job scheduling processes on a third node in the cluster. The first set of job scheduling processes, the second set of job scheduling processes, and the third set of job scheduling processes may store information regarding jobs, schedules, and the states of jobs using a metadata store, such as distributed metadata store 110. In the event that the first node running the first set of job scheduling processes fails (e.g., due to a network failure or a physical machine failure), the states of the jobs managed by the first set of job scheduling processes may fail to be updated within a threshold period of time (e.g., a job may fail to be completed within 30 seconds or within 3 minutes from being started). In response to detecting jobs that have failed to be updated within the threshold period of time, the distributed job scheduler 108 may undo and restart the failed jobs on available nodes within the cluster.

The job scheduling processes running on at least a plurality of nodes in a cluster (e.g., on each available node in the cluster) may manage the scheduling and execution of a plurality of jobs. The job scheduling processes may include run processes for running jobs, cleanup processes for cleaning up failed tasks, and rollback processes for rolling-back or undoing any actions or tasks performed by failed jobs. In one embodiment, the job scheduling processes may detect that a particular task for a particular job has failed and in response may perform a cleanup process to clean up or remove the effects of the particular task and then perform a rollback process that processes one or more completed tasks for the particular job in reverse order to undo the effects of the one or more completed tasks. Once the particular job with the failed task has been undone, the job scheduling processes may restart the particular job on an available node in the cluster.

The distributed job scheduler 108 may manage a job in which a series of tasks associated with the job are to be performed atomically (i.e., partial execution of the series of tasks is not permitted). If the series of tasks cannot be completely executed or there is any failure that occurs to one of the series of tasks during execution (e.g., a hard disk associated with a physical machine fails or a network connection to the physical machine fails), then the state of a data management system may be returned to a state as if none of the series of tasks were ever performed. The series of tasks may correspond with an ordering of tasks for the series of tasks and the distributed job scheduler 108 may ensure that each task of the series of tasks is executed based on the ordering of tasks. Tasks that do not have dependencies with each other may be executed in parallel.

In some cases, the distributed job scheduler 108 may schedule each task of a series of tasks to be performed on a specific node in a cluster. In other cases, the distributed job scheduler 108 may schedule a first task of the series of tasks to be performed on a first node in a cluster and a second task of the series of tasks to be performed on a second node in the cluster. In these cases, the first task may have to operate on a first set of data (e.g., a first file stored in a file system) stored on the first node and the second task may have to operate on a second set of data (e.g., metadata related to the first file that is stored in a database) stored on the second node. In some embodiments, one or more tasks associated with a job may have an affinity to a specific node in a cluster. In one example, if the one or more tasks require access to a database that has been replicated on three nodes in a cluster, then the one or more tasks may be executed on one of the three nodes. In another example, if the one or more tasks require access to multiple chunks of data associated with a virtual disk that has been replicated over four nodes in a cluster, then the one or more tasks may be executed on one of the four nodes. Thus, the distributed job scheduler 108 may assign one or more tasks associated with a job to be executed on a particular node in a cluster based on the location of data required to be accessed by the one or more tasks.

In one embodiment, the distributed job scheduler 108 may manage a first job associated with capturing and storing a snapshot of a virtual machine periodically (e.g., every 30 minutes). The first job may include one or more tasks, such as communicating with a virtualized infrastructure manager, such as the virtualized infrastructure manager 199 in FIG. 1C, to create a frozen copy of the virtual machine and to transfer one or more chunks (or one or more files) associated with the frozen copy to a storage appliance, such as storage appliance 170 in FIG. 1B. The one or more tasks may also include generating metadata for the one or more chunks, storing the metadata using the distributed metadata store 110, storing the one or more chunks within the distributed file system 112, and communicating with the virtualized infrastructure manager that the virtual machine the frozen copy of the virtual machine may be unfrozen or released for a frozen state. The metadata for a first chunk of the one or more chunks may include information specifying a version of the virtual machine associated with the frozen copy, a time associated with the version (e.g., the snapshot of the virtual machine was taken at 5:30 p.m. on Jun. 29, 2024), and a file path to where the first chunk is stored within the distributed file system 112 (e.g., the first chunk is located at /snapshots/VM_B/s1/s1.chunk1). The one or more tasks may also include deduplication, compression (e.g., using a lossless data compression algorithm such as LZ4 or LZ77), decompression, encryption (e.g., using a symmetric key algorithm such as Triple DES or AES-256), and decryption related tasks.

The virtualization interface 104 may provide an interface for communicating with a virtualized infrastructure manager managing a virtualization infrastructure, such as virtualized infrastructure manager 199 in FIG. 1C, and requesting data associated with virtual machine snapshots from the virtualization infrastructure. The virtualization interface 104 may communicate with the virtualized infrastructure manager using an API for accessing the virtualized infrastructure manager (e.g., to communicate a request for a snapshot of a virtual machine). In this case, storage appliance 170 may request and receive data from a virtualized infrastructure without requiring agent software to be installed or running on virtual machines within the virtualized infrastructure. The virtualization interface 104 may request data associated with virtual blocks stored on a virtual disk of the virtual machine that have changed since a last snapshot of the virtual machine was taken or since a specified prior point in time. Therefore, in some cases, if a snapshot of a virtual machine is the first snapshot taken of the virtual machine, then a full image of the virtual machine may be transferred to the storage appliance. However, if the snapshot of the virtual machine is not the first snapshot taken of the virtual machine, then only the data blocks of the virtual machine that have changed since a prior snapshot was taken may be transferred to the storage appliance.

The virtual machine search index 106 may include a list of files that have been stored using a virtual machine and a version history for each of the files in the list. Each version of a file may be mapped to the earliest point-in-time snapshot of the virtual machine that includes the version of the file or to a snapshot of the virtual machine that include the version of the file (e.g., the latest point-in-time snapshot of the virtual machine that includes the version of the file). In one example, the virtual machine search index 106 may be used to identify a version of the virtual machine that includes a particular version of a file (e.g., a particular version of a database, a spreadsheet, or a word processing document). In some cases, each of the virtual machines that are backed up or protected using storage appliance 170 may have a corresponding virtual machine search index.

In one embodiment, as each snapshot of a virtual machine is ingested each virtual disk associated with the virtual machine is parsed in order to identify a file system type associated with the virtual disk and to extract metadata (e.g., file system metadata) for each file stored on the virtual disk. The metadata may include information for locating and retrieving each file from the virtual disk. The metadata may also include a name of a file, the size of the file, the last time at which the file was modified, and a content checksum for the file. Each file that has been added, deleted, or modified since a previous snapshot was captured may be determined using the metadata (e.g., by comparing the time at which a file was last modified with a time associated with the previous snapshot). Thus, for every file that has existed within any of the snapshots of the virtual machine, a virtual machine search index may be used to identify when the file was first created (e.g., corresponding with a first version of the file) and at what times the file was modified (e.g., corresponding with subsequent versions of the file). Each version of the file may be mapped to a particular version of the virtual machine that stores that version of the file.

In some cases, if a virtual machine includes a plurality of virtual disks, then a virtual machine search index may be generated for each virtual disk of the plurality of virtual disks. For example, a first virtual machine search index may catalog and map files located on a first virtual disk of the plurality of virtual disks and a second virtual machine search index may catalog and map files located on a second virtual disk of the plurality of virtual disks. In this case, a global file catalog or a global virtual machine search index for the virtual machine may include the first virtual machine search index and the second virtual machine search index. A global file catalog may be stored for each virtual machine backed up by a storage appliance within a file system, such as distributed file system 112 in FIG. 1D.

The data management system 102 may comprise an application running on the storage appliance that manages and stores one or more snapshots of a virtual machine. In one example, the data management system 102 may comprise a highest level layer in an integrated software stack running on the storage appliance. The integrated software stack may include the data management system 102, the virtualization interface 104, the distributed job scheduler 108, the distributed metadata store 110, and the distributed file system 112. In some cases, the integrated software stack may run on other computing devices, such as a server or computing device 154 in FIG. 1B. The data management system 102 may use the virtualization interface 104, the distributed job scheduler 108, the distributed metadata store 110, and the distributed file system 112 to manage and store one or more snapshots of a virtual machine. Each snapshot of the virtual machine may correspond with a point-in-time version of the virtual machine. The data management system 102 may generate and manage a list of versions for the virtual machine. Each version of the virtual machine may map to or reference one or more chunks and/or one or more files stored within the distributed file system 112. Combined together, the one or more chunks and/or the one or more files stored within the distributed file system 112 may comprise a full image of the version of the virtual machine.

Figure 2:
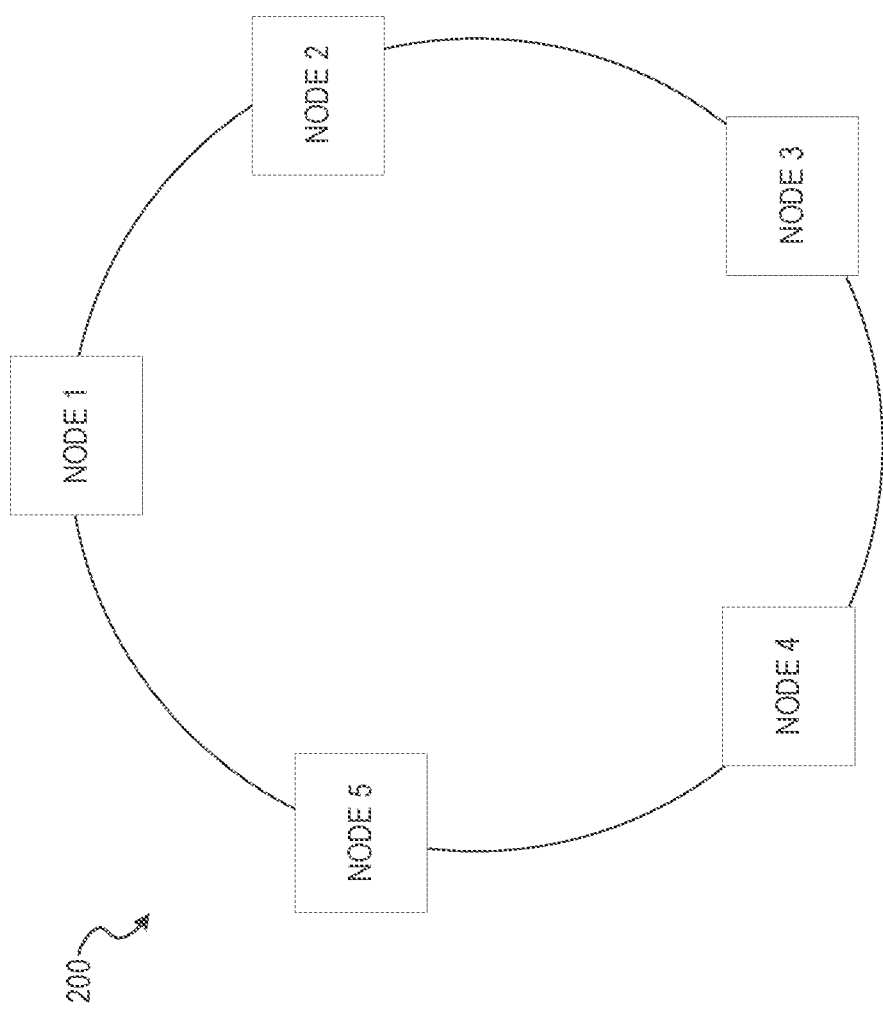
FIG. 2 is a block diagram illustrating an example cluster of a distributed decentralized database, according to some example embodiments.

FIG. 2 is a block diagram illustrating an example cluster 200 of a distributed decentralized database, according to some example embodiments. In some embodiments, the cluster 200 is Cluster A, B or C in FIG. 1A. The centralized management system 103 may remotely add or delete nodes from the cluster 200 after the user is authenticated and authorized via the federated login system 105. As illustrated, the example cluster 200 includes five nodes, nodes 1-5. In some example embodiments, each of the five nodes runs from different machines, such as physical machine 130 in FIG. 1D or virtual machine 198 in FIG. 1C. The nodes in the example cluster 200 can include instances of peer nodes of a distributed database (e.g., cluster-based database, distributed decentralized database management system, a NoSQL database, Apache Cassandra, DataStax, MongoDB, CouchDB), according to some example embodiments. The distributed database system is distributed in that data is sharded or distributed across the example cluster 200 in shards or chunks and decentralized in that there is no central storage device and no single point of failure. The system operates under an assumption that multiple nodes may go down, up, or become non-responsive, and so on. Sharding is splitting up of the data horizontally and managing each shard separately on different nodes. For example, if the data managed by the example cluster 200 can be indexed using the 26 letters of the alphabet, node 1 can manage a first shard that handles records that start with A through E, node 2 can manage a second shard that handles records that start with F through J, and so on.

In some example embodiments, data written to one of the nodes is replicated to one or more other nodes per a replication protocol of the example cluster 200. For example, data written to node 1 can be replicated to nodes 2 and 3. If node 1 prematurely terminates, node 2 and/or 3 can be used to provide the replicated data. In some example embodiments, each node of example cluster 200 frequently exchanges state information about itself and other nodes across the example cluster 200 using gossip protocol. Gossip protocol is a peer-to-peer communication protocol in which each node randomly shares (e.g., communicates, requests, transmits) location and state information about the other nodes in a given cluster.

Writing: For a given node, a sequentially written commit log captures the write activity to ensure data durability. The data is then written to an in-memory structure (e.g., a memtable, write-back cache). Each time the in-memory structure is full, the data is written to disk in a Sorted String Table data file. In some example embodiments, writes are automatically partitioned and replicated throughout the example cluster 200.

Reading: Any node of example cluster 200 can receive a read request (e.g., query) from an external client. If the node that receives the read request manages the data requested, the node provides the requested data. If the node does not manage the data, the node determines which node manages the requested data. The node that received the read request then acts as a proxy between the requesting entity and the node that manages the data (e.g., the node that manages the data sends the data to the proxy node, which then provides the data to an external entity that generated the request).

The distributed decentralized database system is decentralized in that there is no single point of failure due to the nodes being symmetrical and seamlessly replaceable. For example, whereas conventional distributed data implementations have nodes with different functions (e.g., master/slave nodes, asymmetrical database nodes, federated databases), the nodes of example cluster 200 are configured to function the same way (e.g., as symmetrical peer database nodes that communicate via gossip protocol, such as Cassandra nodes) with no single point of failure. If one of the nodes in example cluster 200 terminates prematurely ("goes down"), another node can rapidly take the place of the terminated node without disrupting service. The example cluster 200 can be a container for a keyspace, which is a container for data in the distributed decentralized database system (e.g., whereas a database is a container for containers in conventional relational databases, the Cassandra keyspace is a container for a Cassandra database system).

Figure 3:
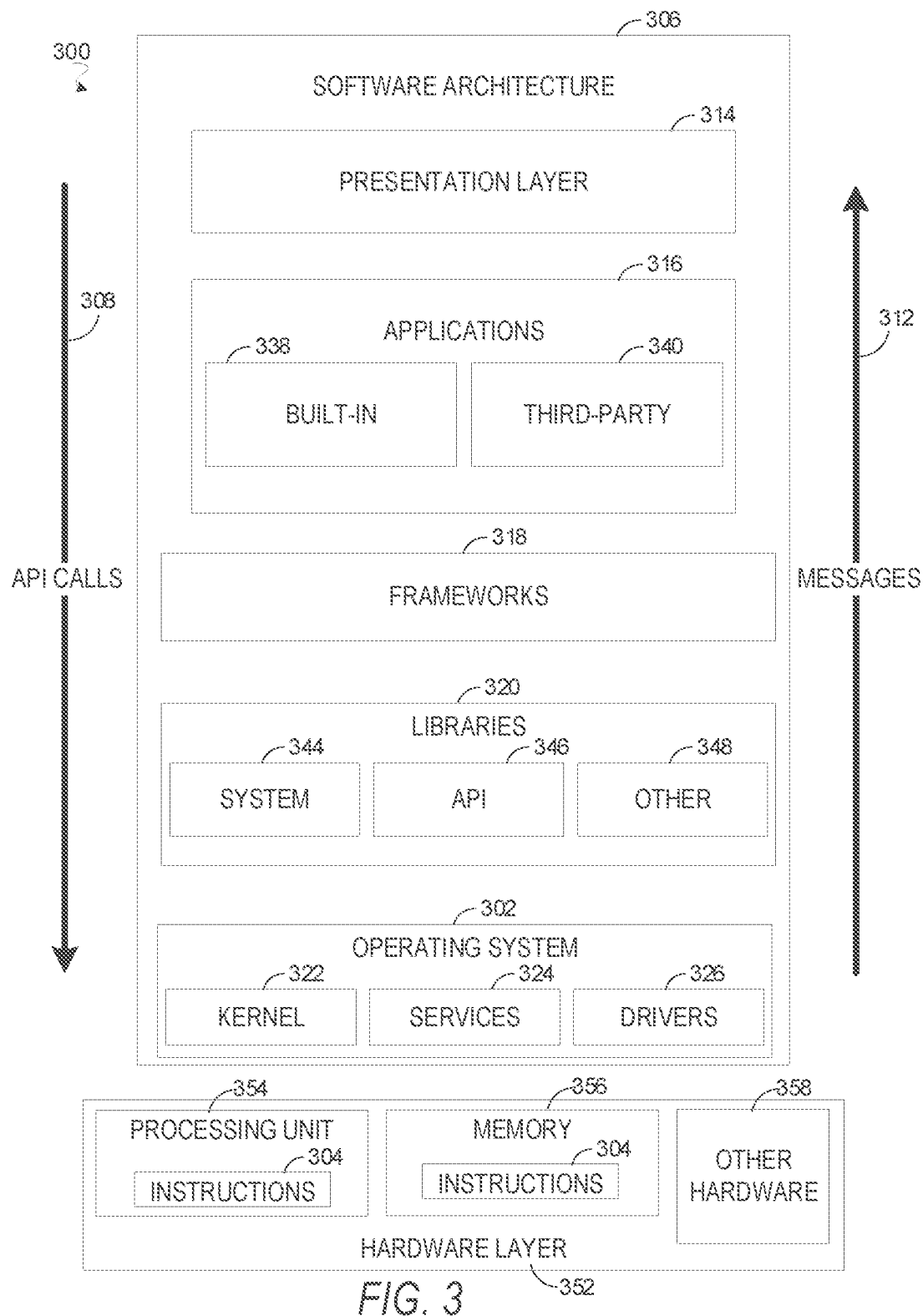
FIG. 3 is a block diagram illustrating an example architecture of software that can be used to implement various embodiments described herein.

FIG. 3 is a block diagram 300 illustrating an example architecture of software 306 that can be used to implement various embodiments described herein. FIG. 3 is merely a non-limiting example of a software architecture, and it will be appreciated that many other architectures can be implemented to facilitate the functionality described herein. In various embodiments, the software 306 is implemented by a hardware layer 352, which includes a processor 354 operating on instructions 304, a memory 356 storing instructions 304, and other hardware 358. For some embodiments, the hardware layer 352 is implemented using a machine 400 of FIG. 4 that includes processors 410, memory 430, and I/O components 450. In this example architecture, the software 306 can be conceptualized as a stack of layers where each layer may provide a particular functionality. For example, the software 306 includes layers such as an operating system 302, libraries 320, frameworks 318, and applications 316. Operationally, the applications 316 invoke application programming interface (API) calls 308 through the software stack and receive messages 312 in response to the API calls 308, consistent with some embodiments.

In various implementations, the operating system 302 manages hardware resources and provides common services. The operating system 302 includes, for example, a kernel 322, services 324, and drivers 326. The kernel 322 acts as an abstraction layer between the hardware and the other software layers, consistent with some embodiments.

For example, the kernel 322 provides memory management, processor management (e.g., scheduling), component management, networking, and security settings, among other functionality. The services 324 can provide other common services for the other software layers. The drivers 326 are responsible for controlling or interfacing with the underlying hardware, according to some embodiments. For instance, the drivers 326 can include display drivers, camera drivers, BLUETOOTH® or BLUETOOTH® Low Energy drivers, flash memory drivers, serial communication drivers (e.g., Universal Serial Bus (USB) drivers), WI-FT® drivers, audio drivers, power management drivers, and so forth.

In some embodiments, the libraries 320 provide a low-level common infrastructure utilized by the applications 316. The libraries 320 can include system libraries 344 (e.g., C standard library) that can provide functions such as memory allocation functions, string manipulation functions, mathematic functions, and the like. In addition, the libraries 320 can include API libraries 346 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 320 can also include a wide variety of other libraries 348 to provide many other APIs to the applications 316.

The frameworks 318 provide a high-level common infrastructure that can be utilized by the applications 316, according to some embodiments. For example, the frameworks 318 provide various graphic user interface (GUI) functions, high-level resource management, high-level location services, and so forth. The frameworks 318 can provide a broad spectrum of other APIs that can be utilized by the applications 316, some of which may be specific to a particular operating system or platform.

In some embodiments, the applications 316 include a built-in application 338 and a broad assortment of other applications such as a third-party application 340. According to some embodiments, the applications 316 are programs that execute functions defined in the programs. Various programming languages can be employed to create one or more of the applications 316, structured in a variety of manners, such as object-oriented programming languages (e.g., Objective-C, Java, or C++) or procedural programming languages (e.g., C or assembly language). In a specific example, the third-party application 340 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 340 can invoke the API calls 308 provided by the operating system 302 to facilitate functionality described herein.

Figure 4:
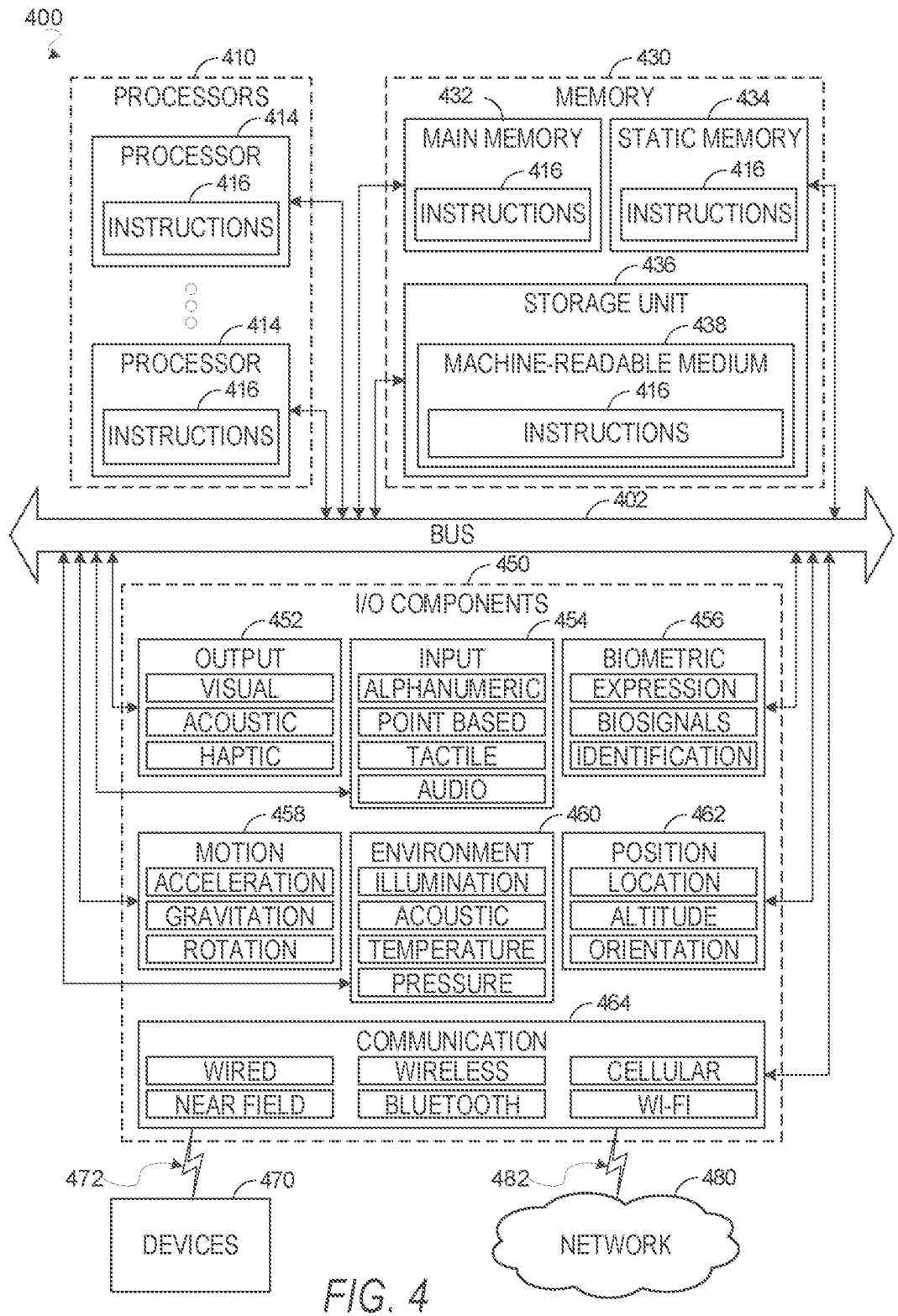
FIG. 4 illustrates a diagrammatic representation of an example machine in the form of a computer system within which a set of instructions may be executed for causing the machine to perform any one or more of the methodologies of various embodiments described herein.

FIG. 4 illustrates a diagrammatic representation of an example machine 400 in the form of a computer system within which a set of instructions may be executed for causing the machine to perform any one or more of the methodologies of various embodiments described herein. Specifically, FIG. 4 shows a diagrammatic representation of the machine 400 in the example form of a computer system, within which instructions 416 (e.g., software, a program, an application, an applet, an app, or other executable code) for causing the machine 400 to perform any one or more of the methodologies discussed herein may be executed. The instructions 416 transform the general, non-programmed machine 400 into a particular machine 400 programmed to carry out the described and illustrated functions in the manner described. In alternative embodiments, the machine 400 operates as a standalone device or may be coupled (e.g., networked) to other machines. In a networked deployment, the machine 400 may operate in the capacity of a server machine or a client machine in a server-client network environment, or as a peer machine in a peer-to-peer (or distributed) network environment. The machine 400 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 416, sequentially or otherwise, that specify actions to be taken by the machine 400. Further, while only a single machine 400 is illustrated, the term "machine" shall also be taken to include a collection of machines 400 that individually or jointly execute the instructions 416 to perform any one or more of the methodologies discussed herein.

The machine 400 may include processors 410, memory 430, and I/O components 450, which may be configured to communicate with each other such as via a bus 402. In some embodiments, the processors 410 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 412 and a processor 414 that may execute the instructions 416. The term "processor" is intended to include multi-core processors that may comprise two or more independent processors (sometimes referred to as "cores") that may execute instructions contemporaneously. Although FIG. 4 shows multiple processors 410, the machine 400 may include a single processor with a single core, a single processor with multiple cores (e.g., a multi-core processor), multiple processors with a single core, multiple processors with multiples cores, or any combination thereof.

The memory 430 may include a main memory 432, a static memory 434, and a storage unit 436, both accessible to the processors 410 such as via the bus 402. The main memory 432, the static memory 434, and storage unit 436 store the instructions 416 embodying any one or more of the methodologies or functions described herein. The instructions 416 may also reside, completely or partially, within the main memory 432, within the static memory 434, within the storage unit 436, within at least one of the processors 410 (e.g., within the processor's cache memory), or any suitable combination thereof, during execution thereof by the machine 400. The storage unit 436 can comprise a machine-readable medium 438 for storing the instructions 416.

The I/O components 450 may include a wide variety of components to receive input, provide output, produce output, transmit information, exchange information, capture measurements, and so on. The specific I/O components 450 that are included in a particular machine will depend on the type of machine. For example, portable machines such as mobile phones will likely include a touch input device or other such input mechanisms, while a headless server machine will likely not include such a touch input device. It will be appreciated that the I/O components 450 may include many other components that are not shown in FIG. 4. The I/O components 450 are grouped according to functionality merely for simplifying the following discussion and the grouping is in no way limiting. In various embodiments, the I/O components 450 may include output components 452 and input components 454. The output components 452 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 454 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further embodiments, the I/O components 450 may include biometric components 456, motion components 458, environmental components 460, or position components 462, among a wide array of other components. For example, the biometric components 456 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 458 may include acceleration sensor components (e.g., accelerometer), gravitation sensor components, rotation sensor components (e.g., gyroscope), and so forth. The environmental components 460 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 462 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 450 may include communication components 464 operable to couple the machine 400 to a network 480 or devices 470 via a coupling 482 and a coupling 472, respectively. For example, the communication components 464 may include a network interface component or another suitable device to interface with the network 480. In further examples, the communication components 464 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 470 may be another machine or any of a wide variety of peripheral devices (e.g., a peripheral device coupled via a USB).

Moreover, the communication components 464 may detect identifiers or include components operable to detect identifiers. For example, the communication components 464 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 464, such as location via Internet Protocol (IP) geolocation, location via Wi-Fi® signal triangulation, location via detecting an NFC beacon signal that may indicate a particular location, and so forth.

The various memories (i.e., 430, 432, 434, and/or memory of the processor(s) 410) and/or storage unit 436 may store one or more sets of instructions and data structures (e.g., software) embodying or utilized by any one or more of the methodologies or functions described herein. These instructions (e.g., the instructions 416), when executed by processor(s) 410, cause various operations to implement the disclosed embodiments.

Figure 5:
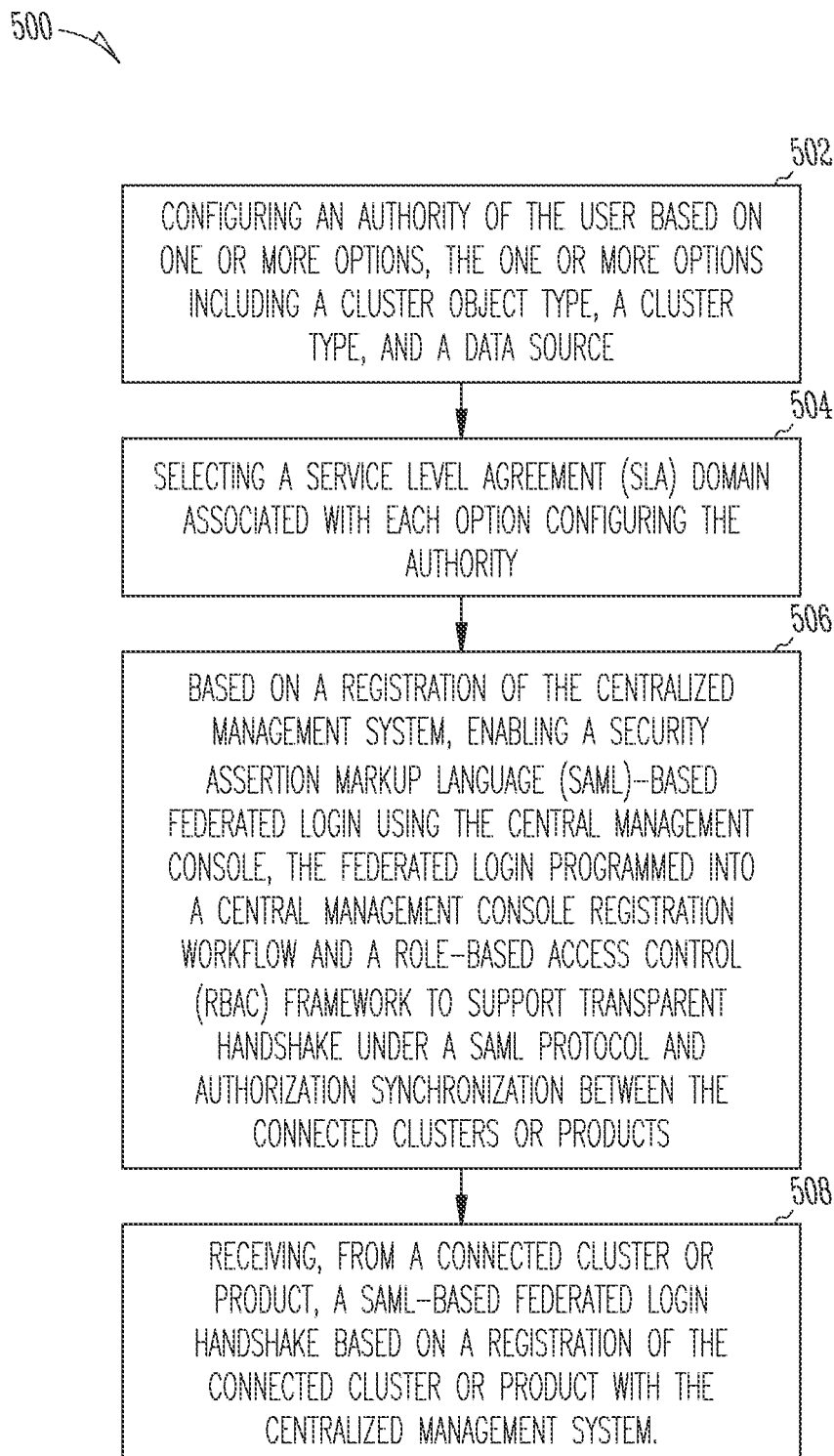
FIG. 5 is a flow chart showing example operations in a method, according to an example embodiment.

Some examples include methods. With reference to FIG. 5, example operations in a method 500 of federated login and authorization are now described. An example method 500 allows a user of a centralized management system to manage connected clusters or products without performing an individual cluster or product login. In some examples, the method 500 including operations comprising at least: in operation 502, configuring an authority of the user based on one or more options, the one or more options including a cluster object type, a cluster type, and a data source; in operation 504, selecting a service level agreement (SLA) domain associated with each option configuring the authority; in operation 506, based on a registration of the centralized management system, enabling a Security Assertion Markup Language (SAML)-based federated login using the central management console, the federated login programmed into a central management console registration workflow and a Role-Based Access Control (RBAC) framework to support transparent handshake under a SAML protocol and authorization synchronization between the connected clusters or products; and, in operation 508, receiving, from a connected cluster or product, a SAML-based federated login handshake based on a registration of the connected cluster or product with the centralized management system.

In some examples, a SAML specification includes an identity provider (IdP), and a service provider (SP).

In some examples, for a federated login mechanism, the centralized management system serves as the IdP, and a connected cluster or product serves as the SP.

In some examples, for an IdP-initiated login, the operations further comprise receiving from the user of the centralized management system a selection of a resource listed on an inventory page of the central management console, the selection directing the user to a web user interface (UI) of a connected cluster or product associated with the resource.

In some examples, the resource includes a protected database or a virtual machine.

In some examples, for an SP-initiated federated login, the operations further comprise enabling an identified user of the centralized management system to log in to a web UI of a connected cluster using the identity of the user of the centralized management system.

In some examples, the operations further comprise configuring a Role-Based Access Control (RBAC) in the centralized management system, and based on an implemented RBAC configuration in the centralized management system, automatically applying RBAC across all connected clusters or products.

In some examples, the operations further comprise enabling RBAC across all the connected clusters or products by passing, via a translation layer of the centralized management system, authorization information of the user using a role-based attribute in an SAML assertion session.

In some examples, the operations further comprise storing a mapping between the SAML assertion session and the authorization information.

In some examples, a non-transitory machine-readable medium comprises instructions which, when read by a machine, cause the machine to implement operations in a method of federated login and authorization allowing a user of a centralized management system to manage connected clusters or products without performing an individual cluster or product login In some examples, the operations include those summarized above with reference to FIG. 5, or as described elsewhere herein.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various embodiments, one or more portions of the network 480 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 480 or a portion of the network 480 may include a wireless or cellular network, and the coupling 482 may be a Code Division Multiple Access (CDMA) connection, a Global System for Mobile communications (GSM) connection, or another type of cellular or wireless coupling. In this example, the coupling 482 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 416 may be transmitted or received over the network 480 using a transmission medium via a network interface device (e.g., a network interface component included in the communication components 464) and utilizing any one of a number of well-known transfer protocols (e.g., hypertext transfer protocol (HTTP)). Similarly, the instructions 416 may be transmitted or received using a transmission medium via the coupling 472 (e.g., a peer-to-peer coupling) to the devices 470. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 416 for execution by the machine 400, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

Other embodiments can comprise corresponding systems, apparatus, and computer programs recorded on one or more machine readable media, each configured to perform the operations of the methods.

The disclosed technology may be described in the context of computer-executable instructions, such as software or program modules, being executed by a computer or processor. The computer-executable instructions may comprise portions of computer program code, routines, programs, objects, software components, data structures, or other types of computer-related structures that may be used to perform processes using a computer. In some cases, hardware or combinations of hardware and software may be substituted for software or used in place of software.

Computer program code used for implementing various operations or aspects of the disclosed technology may be developed using one or more programming languages, including an object-oriented programming language such as Java or C++, a procedural programming language such as the "C" programming language or Visual Basic, or a dynamic programming language such as Python or JavaScript. In some cases, computer program code or machine-level instructions derived from the computer program code may execute entirely on an end user's computer, partly on an end user's computer, partly on an end user's computer and partly on a remote computer, or entirely on a remote computer or server.

For purposes of this document, it should be noted that the dimensions of the various features depicted in the Figures may not necessarily be drawn to scale.

For purposes of this document, reference in the specification to "an embodiment," "one embodiment," "some embodiments," or "another embodiment" may be used to describe different embodiments and do not necessarily refer to the same embodiment.

For purposes of this document, a connection may be a direct connection or an indirect connection (e.g., via another part). In some cases, when an element is referred to as being connected or coupled to another element, the element may be directly connected to the other element or indirectly connected to the other element via intervening elements. When an element is referred to as being directly connected to another element, then there are no intervening elements between the element and the other element.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

What is claimed is:

1. A method, comprising:
    configuring, at a centralized management system, an authority of a user to access resources associated with the centralized management system;
    translating, at the centralized management system, the authority of the user to obtain a translated authorization information associated with an access control system of a cluster, wherein the translated authorization information comprises one or more role based attributes and is indicative of the authority of the user and is based at least in part on a version of the cluster;
    receiving, from the cluster based at least in part on registration of the cluster at the centralized management system, a security assertion markup language (SAML)-based login handshake;
    transmitting, to the cluster associated with the centralized management system and via a SAML-assertion in response to receiving the SAML-based login handshake, the translated authorization information corresponding to the authority of the user and comprising the one or more role based attributes for the user, wherein the translated authorization information is transmitted by the centralized management system in response to registration of the cluster with the centralized management system;
    receiving, from the user and at the centralized management system, a selection of a resource of the cluster; and
    directing, in response to the selection of the resource of the cluster, the user to a user interface (UI) of the cluster, wherein the SAML-assertion enables the user to manage the cluster without performing an individual cluster login.

2. The method of claim 1, wherein the translated authorization information indicates the authority of the user to access each resource of a set of resources managed by the cluster.

3. The method of claim 1, further comprising:
    storing, at the centralized management system, the translated authorization information corresponding to the authority of the user.

4. The method of claim 1, wherein the translated authorization information supports access to one or more different clusters via login by the user at the UI of the cluster.

5. The method of claim 1, wherein the resources associated with the centralized management system comprise one or more databases, one or more virtual machines, or a combination thereof.

6. The method of claim 1, wherein the authority configured for the user is based at least in part on one or more options of a set of options comprising an object type on the cluster, a cluster type of the cluster, a data source, or any combination thereof, and wherein the method further comprises:
    obtaining a selection of a service level agreement (SLA) domain for each of the one or more options of the set of options.

7. A centralized management system, comprising:
    one or more memories storing processor-executable code; and
    one or more processors coupled with the one or more memories and individually or collectively operable to execute the code to cause the centralized management system to:
        configure, at the centralized management system, an authority of a user to access resources associated with the centralized management system;
        translate, at the centralized management system, the authority of the user to obtain a translated authorization information associated with an access control system of a cluster, wherein the translated authorization information comprises one or more role based attributes and is indicative of the authority of the user and is based at least in part on a version of the cluster;
        receive, from the cluster based at least in part on registration of the cluster at the centralized management system, a security assertion markup language (SAML)-based login handshake;
        transmit, to the cluster associated with the centralized management system and via a SAML-assertion in response to receiving the SAML-based login handshake, the translated authorization information corresponding to the authority of the user and comprising the one or more role based attributes for the user, wherein the translated authorization information is transmitted by the centralized management system in response to registration of the cluster with the centralized management system;
        receive, from the user and at the centralized management system, a selection of a resource of the cluster; and
        direct, in response to the selection of the resource of the cluster, the user to a user interface (UI) of the cluster, wherein the SAML-assertion enables the user to manage the cluster without performing an individual cluster login.

8. The centralized management system of claim 7, wherein the translated authorization information indicates the authority of the user to access each resource of a set of resources managed by the cluster.

9. The centralized management system of claim 7, wherein the one or more processors are individually or collectively further operable to execute the code to cause the centralized management system to:
store, at the centralized management system, the translated authorization information corresponding to the authority of the user.

10. The centralized management system of claim 7, wherein the translated authorization information supports access to one or more different clusters via login by the user at the UI of the cluster.

11. The centralized management system of claim 7, wherein the resources associated with the centralized management system comprise one or more databases, one or more virtual machines, or a combination thereof.

12. A non-transitory computer-readable medium storing code, the code comprising instructions executable by one or more processors to:
configure, at a centralized management system, an authority of a user to access resources associated with the centralized management system;
translate, at the centralized management system, the authority of the user to obtain a translated authorization information associated with an access control system of a cluster, wherein the translated authorization information comprises one or more role based attributes and is indicative of the authority of the user and is based at least in part on a version of the cluster;
receive, from the cluster based at least in part on registration of the cluster at the centralized management system, a security assertion markup language (SAML)-based login handshake;
transmit, to the cluster associated with the centralized management system and via a SAML-assertion in response to receiving the SAML-based login handshake, the translated authorization information corresponding to the authority of the user and comprising the one or more role based attributes for the user, wherein the translated authorization information is transmitted by the centralized management system in response to registration of the cluster with the centralized management system;
receive, from the user and at the centralized management system, a selection of a resource of the cluster; and
direct, in response to the selection of the resource of the cluster, the user to a user interface (UI) of the cluster, wherein the SAML-assertion enables the user to manage the cluster without performing an individual cluster login.

13. The non-transitory computer-readable medium of claim 12, wherein the translated authorization information indicates the authority of the user to access each resource of a set of resources managed by the cluster.

14. The non-transitory computer-readable medium of claim 12, wherein the instructions are further executable by the one or more processors to:
store, at the centralized management system, the translated authorization information corresponding to the authority of the user.

* * * * *